United States Patent
Nishio et al.

(10) Patent No.: US 11,855,319 B2
(45) Date of Patent: Dec. 26, 2023

(54) FUEL CELL SYSTEM

(71) Applicant: HONDA MOTOR CO., LTD., Tokyo (JP)

(72) Inventors: Jin Nishio, Wako (JP); Tomonari Hattori, Wako (JP); Koichi Kato, Wako (JP); Yusai Yoshimura, Wako (JP); Kazuhide Inoue, Wako (JP); Koichi Takaku, Wako (JP); Kuniaki Ojima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/680,222

(22) Filed: Feb. 24, 2022

(65) Prior Publication Data

US 2022/0311032 A1    Sep. 29, 2022

(30) Foreign Application Priority Data

Mar. 26, 2021   (JP) ................. 2021-053587

(51) Int. Cl.
*H01M 8/04664* (2016.01)
*H01M 8/04228* (2016.01)
*H01M 8/04119* (2016.01)

(52) U.S. Cl.
CPC ... *H01M 8/04679* (2013.01); *H01M 8/04126* (2013.01); *H01M 8/04228* (2016.02); *H01M 2250/20* (2013.01)

(58) Field of Classification Search
CPC ......... H01M 8/04679; H01M 8/04126; H01M 8/04228; H01M 2250/20; H01M 8/04201; H01M 8/04753
See application file for complete search history.

(56) References Cited

U.S. PATENT DOCUMENTS

| | | | |
|---|---|---|---|
| 2012/0015268 A1* | 1/2012 | Yoshida ............ | H01M 8/04567 429/429 |
| 2016/0380294 A1* | 12/2016 | Shiokawa ......... | H01M 8/04253 429/414 |
| 2017/0250420 A1* | 8/2017 | Nakagawa ........ | H01M 8/04664 |
| 2018/0233755 A1* | 8/2018 | Saito ..................... | H01M 8/043 |
| 2020/0243877 A1* | 7/2020 | Amano ............. | H01M 8/04664 |

FOREIGN PATENT DOCUMENTS

JP    2017-157297 A    9/2017

* cited by examiner

*Primary Examiner* — Stewart A Fraser
(74) *Attorney, Agent, or Firm* — Carrier, Shende & Associates P.C.; Joseph P. Carrier; Jeffrey T. Gedeon

(57) ABSTRACT

When leakage of fuel gas is detected by detection signals or disruption of the detection signals is detected, a FCECU limits a supply amount of the fuel gas from a fuel gas supply device, and shuts off the supply of the fuel gas by the fuel gas supply device when determining, after limiting the supply amount of the fuel gas, that the leakage of the fuel gas or the disruption of the detection signals has occurred.

5 Claims, 8 Drawing Sheets

FIG. 5

DETERMINATION TABLE

| STATE | DETECTION STATES OF TWO GAS SENSORS A, B | HYDROGEN LEAKAGE DETERMINATION | | OPERATION COMMAND: Cop | |
|---|---|---|---|---|---|
| | | PRESENT | ABSENT | TURN ON WARNING LAMP | SHUT OFF HYDROGEN |
| I | CONCENTRATION DETECTED BY BOTH GAS SENSORS < THRESHOLD | | ○ | | |
| II | CONCENTRATION DETECTED BY AT LEAST ONE GAS SENSOR ≧ THRESHOLD | ○ | | ○ | ○ |
| III | BOTH GAS SENSORS INDICATE CAN SIGNAL DISRUPTION | ○ | | ○ | ○ |
| IV | ONE GAS SENSOR IS IN FAILURE OR CAN SIGNAL DISRUPTION STATE, AND CONCENTRATION DETECTED BY OTHER GAS SENSOR < THRESHOLD | | ○ | ○ | |

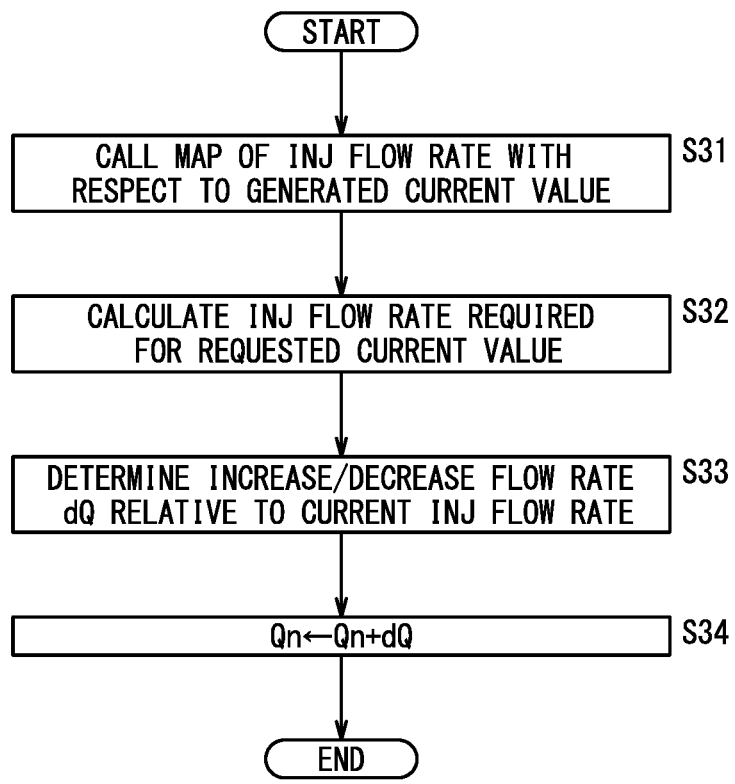

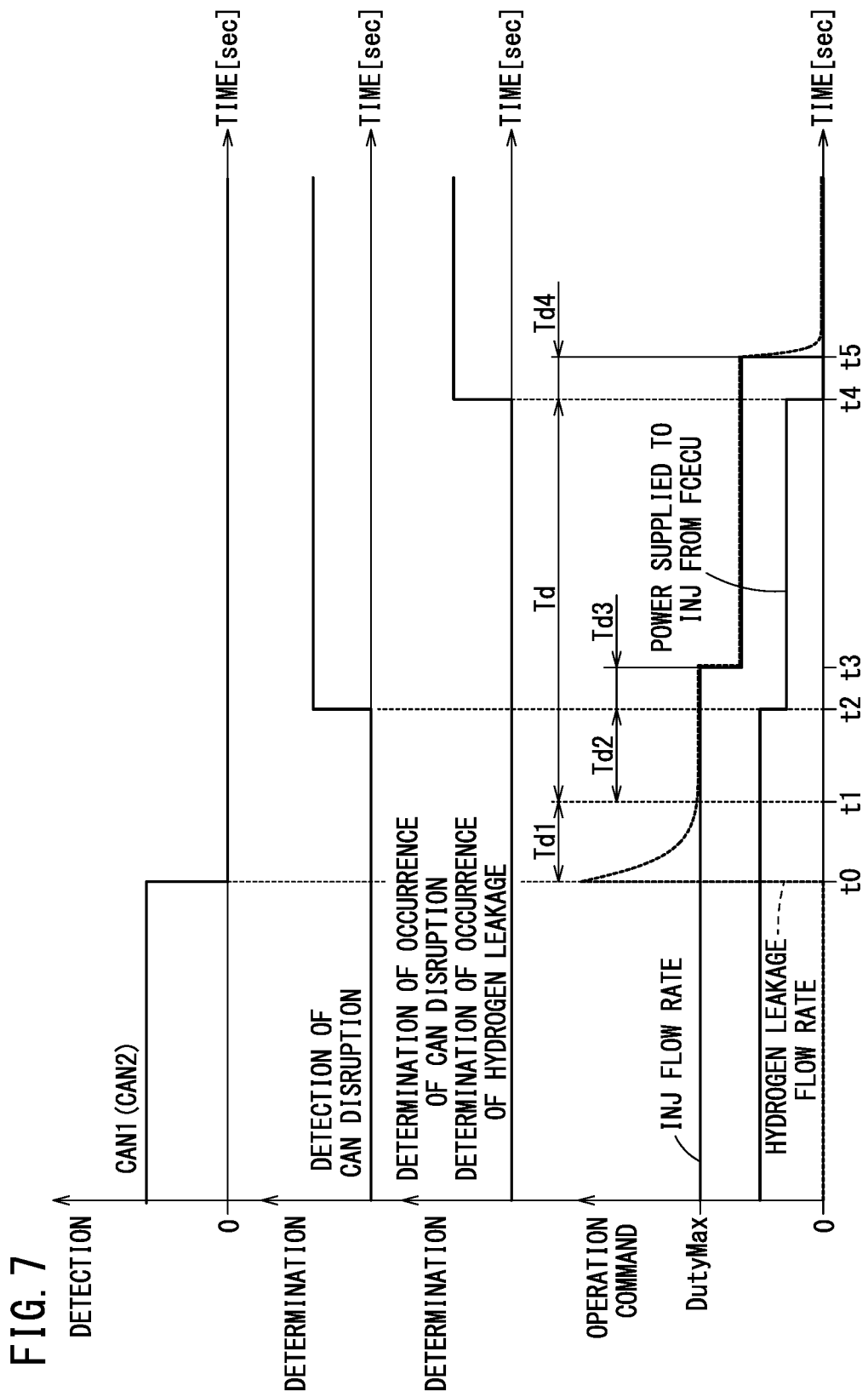

FUEL CELL SYSTEM

CROSS-REFERENCE TO RELATED APPLICATIONS

This application is based upon and claims the benefit of priority from Japanese Patent Application No. 2021-053587 filed on Mar. 26, 2021, the contents of which are incorporated herein by reference.

BACKGROUND OF THE INVENTION

Field of the Invention

The present invention relates to a fuel cell system for controlling the state of supply of a fuel gas to a fuel cell that generates power by an electrochemical reaction between the fuel gas and an oxygen-containing gas. The supply state of the fuel gas is controlled based on a detection signal from a gas sensor that detects leakage of the fuel gas.

Description of the Related Art

For example, JP 2017-157297 A disclose a fuel cell system in which four gas sensors are disposed in a case that houses a fuel cell and that is provided in a motor room in front of a dashboard of a fuel cell vehicle.

This fuel cell system is configured such that, when the gas sensors detect leakage of fuel gas, at least one of a stop valve of a fuel tank that supplies the fuel gas to the fuel cell or an injector is closed (FIG. 1, [0064] of JP 2017-157297 A).

SUMMARY OF THE INVENTION

In general, it is known that a fuel cell deteriorates over time due to an increase in the number of cycles (the number of power generation start/stop cycles) between a power generation start in which supply of an oxygen-containing gas and a fuel gas is started and a power generation stop in which supply of the oxygen-containing gas and the fuel gas is stopped.

Therefore, it is preferable not to increase the number of power generation start/stop cycles in the fuel cell from the viewpoint of reducing the deterioration over time.

Incidentally, a gas sensor mounted on a fuel cell vehicle is configured to transmit a detection signal (indicating presence or absence of gas leakage) to a control device via a connector and a communication line.

In this case, in the fuel cell vehicle, noise is mixed into the detection signal due to noise mixed into the communication line or the like, instantaneous contact failure of the connector, or the like. As a result, although the gas leakage is not actually occurring (no gas leakage), the detection signal instantaneously shifts to a side where the gas leakage is detected (gas leakage is present). In this case, false detection may occur.

However, the fuel cell system disclosed in JP 2017-157297 A is configured to uniformly stop power generation of the fuel cell when leakage of the fuel gas is detected by the gas sensors (step S6 in FIG. 4, [0077] of JP 2017-157297 A). For this reason, there arises a problem in that, even in the case of false detection, power generation of the fuel cell is stopped, and deterioration of the fuel cell over time is accelerated.

The present invention has been made in view of such a problem and an object thereof is to provide a fuel cell system capable of preventing power generation of a fuel cell from being stopped in the case of false detection.

According to an aspect of the present invention, provided is a fuel cell system, comprising: a fuel cell configured to generate power by an electrochemical reaction between a fuel gas and an oxygen-containing gas; a fuel gas supply device configured to supply the fuel gas to the fuel cell; and an oxygen-containing gas supply device configured to supply the oxygen-containing gas to the fuel cell, the fuel cell system further comprising: a gas sensor configured to detect leakage of the fuel gas from the fuel cell; and a control device configured to control a state of supply of the fuel gas by the fuel gas supply device, based on a detection signal from the gas sensor, wherein the control device: limits a supply amount of the fuel gas from the fuel gas supply device when leakage of the fuel gas is detected by the detection signal or when disruption of the detection signal is detected; and shuts off the supply of the fuel gas by the fuel gas supply device when determining, after limiting the supply amount of the fuel gas, that the leakage of the fuel gas or the disruption of the detection signal has occurred.

According to the present invention, when the leakage of the fuel gas is detected by the detection signal of the gas sensor, or the disruption of the detection signal is detected, the control device limits the supply amount of the fuel gas without immediately shutting off the supply of the fuel gas, in order to determine whether or not the detection is false detection.

In this way, it is possible to avoid stopping of power generation of the fuel cell caused by shutoff of the fuel gas due to false detection, and to prevent deterioration of the fuel cell over time.

On the other hand, when it is determined that the detection is not false detection, the fuel gas is shut off, so that leakage of the fuel gas can be prevented.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is an explanatory diagram of a determination table;

FIG. 6 is a flowchart for explaining the operation of INJ flow rate (discharge amount of an injector) restriction control power generation;

FIG. 7 is a timing chart for explaining the operation of the hydrogen leakage detection/shut-off system.

DESCRIPTION OF THE INVENTION

Hereinafter, an embodiment of a fuel cell system according to the present invention will be described in detail with reference to the accompanying drawings.

[Configuration]

Figure 1:
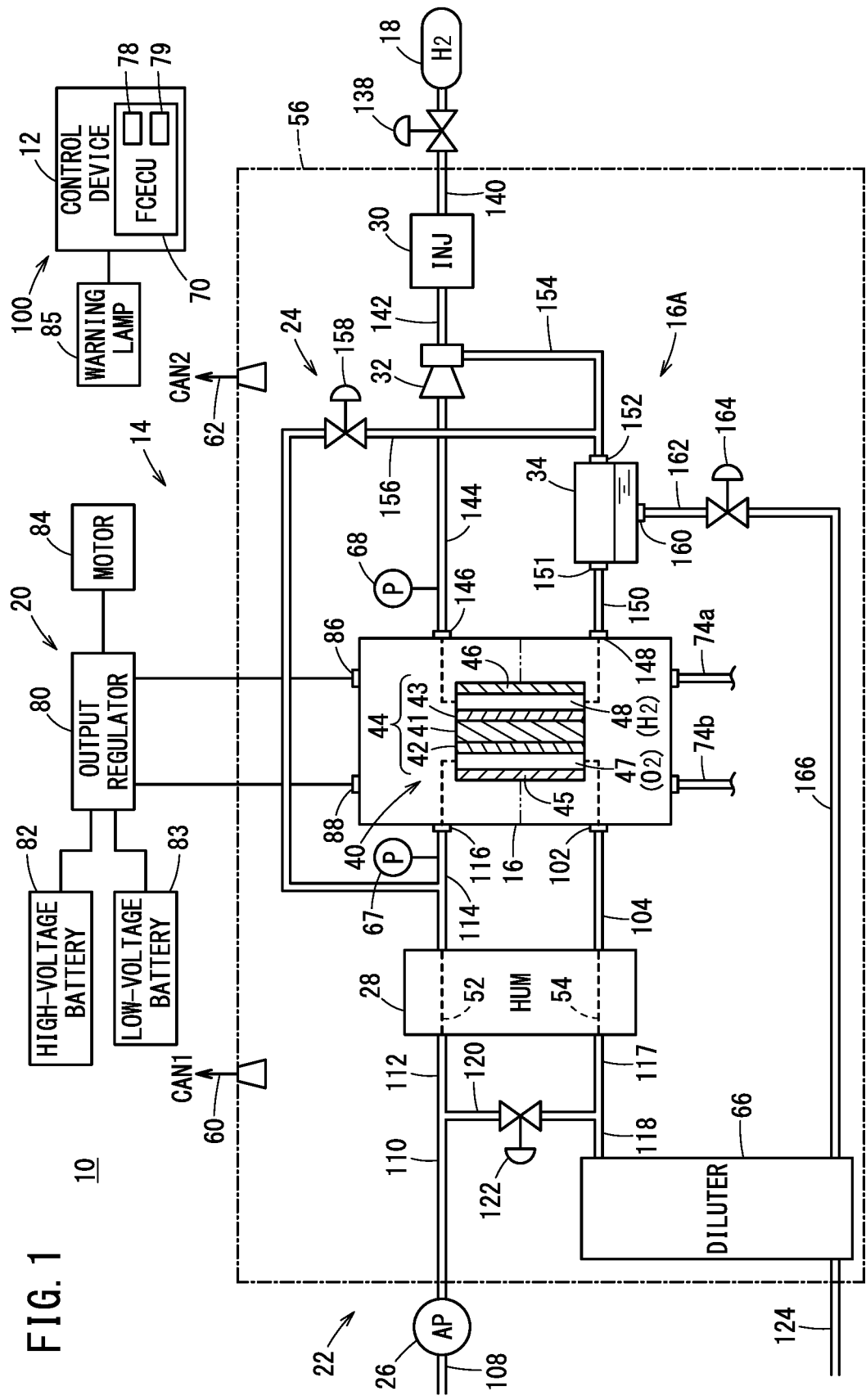
FIG. 1 is a schematic block diagram showing the configuration of a fuel cell vehicle in which a fuel cell system according to an embodiment of the present invention is incorporated.

FIG. 1 is a schematic block diagram showing a schematic configuration of a fuel cell vehicle 10 in which a fuel cell system 14 according to an embodiment of the present invention is incorporated.

The fuel cell vehicle 10 includes a control device 12 that controls the entire fuel cell vehicle 10, the fuel cell system 14, an output unit 20 that is electrically connected to the fuel cell system 14, and a hydrogen leakage detection/shut-off system 100.

The fuel cell system 14 is basically constituted by a fuel cell stack (also simply referred to as a fuel cell) 16, a hydrogen tank 18, an oxygen-containing gas-related device 22, and a fuel gas-related device 24.

The oxygen-containing gas-related device 22 includes an air pump 26 and a humidifier (HUM) 28.

The fuel gas-related device 24 includes an injector (INJ) 30, an ejector (EJT) 32, and a gas-liquid separator 34.

In the fuel cell vehicle 10, the fuel cell system 14 is basically disposed in a motor room under a front hood of the fuel cell vehicle 10 except for the hydrogen tank 18 and a high-voltage battery 82.

The hydrogen tank 18 is disposed, for example, at a rear under floor portion, and the high-voltage battery 82 is disposed, for example, at an under floor portion of an occupant compartment.

A hydrogen-isolating cover 56 serving as a housing is provided in the motor room, and a stack assembly 16A including the fuel cell stack 16 is disposed in the hydrogen-isolating cover 56. Gas sensors A and B for detecting gas leakage of fuel gas (hydrogen) from the fuel cell stack 16 are disposed at two positions above the hydrogen-isolating cover 56.

Electric power is supplied from a low-voltage battery 83 to the gas sensors A and B through signal lines (CAN signal lines) 60 and 62 of a controller area network (CAN). Further, the gas sensors A and B transmit detection signals CAN1 and CAN2 of the gas sensors A and B to the control device 12 through the CAN signal lines 60 and 62. The detection signals CAN1 and CAN2 each include a gas concentration (fuel gas concentration). In practice, the detection signals CAN1 and CAN2 are transmitted to a FCECU 70 described later.

The FCECU 70 refers to a determination table 78 based on the states of the detection signals CAN1 and CAN2 to perform gas leakage (hydrogen leakage) determination. In accordance with the gas leakage determination result, the opening/closing control of a main stop valve 138, and control of the discharge amount (referred to as INJ flow rate) of the injector 30 (including control of discharge shut-off), and lighting control of a warning lamp 85 for gas leakage disposed on an instrument panel, are performed.

In the vicinity of the hydrogen tank 18, the electrically operated main stop valve 138 for shutting off and supplying fuel gas to the fuel cell stack 16 is provided, and the fuel gas is supplied to the fuel cell stack 16 in the hydrogen-isolating cover 56 through a pipeline 140.

In the fuel cell stack 16, a plurality of power generation cells 40 are stacked. The power generation cells 40 each include a membrane electrode assembly 44, and separators 45 and 46 that sandwich the membrane electrode assembly 44.

The membrane electrode assembly 44 includes, for example, a solid polymer electrolyte membrane 41 which is a perfluorosulfonic acid thin membrane containing water, and a cathode 42 and an anode 43 that sandwich the solid polymer electrolyte membrane 41.

The cathode 42 and the anode 43 each include a gas diffusion layer (not shown) made of carbon paper or the like. The porous carbon particles having a platinum alloy supported on the surface thereof are uniformly applied to the surface of the gas diffusion layer to form an electrode catalyst layer (not shown). The electrode catalyst layers are formed on both surfaces of the solid polymer electrolyte membrane 41.

A cathode flow field (oxygen-containing gas flow field) 47 that allows an oxygen-containing gas inlet communication port 116 and an oxygen-containing gas outlet communication port 102 to communicate with each other is formed on the surface of the separator 45 that faces the membrane electrode assembly 44.

An anode flow field (fuel gas flow field) 48 that allows a fuel gas inlet communication port 146 and a fuel gas outlet communication port 148 to communicate with each other is formed on the surface of the separator 46 that faces the membrane electrode assembly 44.

In the anode 43, when the fuel gas is supplied, hydrogen ions are generated from hydrogen molecules by an electrode reaction by the catalyst, and the hydrogen ions pass through the solid polymer electrolyte membrane 41 and move to the cathode 42, while electrons are released from the hydrogen molecules.

The electrons released from the hydrogen molecules move from a negative electrode terminal 86 through an output regulator 80 and an external load to the cathode 42 via a positive electrode terminal 88.

The output regulator 80 charges the high-voltage battery 82 and the low-voltage battery 83 with the generated power. In this case, the output regulator 80 regulates the SOC (remaining capacity) of the high-voltage battery 82 and the power generated by the fuel cell stack 16, and supplies power to a motor 84 and the air pump 26.

At the cathode 42, hydrogen ions and electrons react with oxygen contained in the supplied oxygen-containing gas by the action of the catalyst to produce water.

The air pump 26 has a function of sucking and pressurizing atmospheric air (air), and supplying it to the humidifier 28.

The humidifier 28 includes a flow path 52 through which the oxygen-containing gas (dry air) flows, and a flow path 54 through which exhaust gas (humid oxygen-containing exhaust gas and fuel exhaust gas to be described later) from the cathode flow field 47 of the fuel cell stack 16 flows through the oxygen-containing gas outlet communication port 102 of the fuel cell stack 16 and a pipeline 104.

The humidifier 28 has a function of humidifying the oxygen-containing gas supplied from the air pump 26. That is, the humidifier 28 transfers moisture contained in the exhaust gas to the supply gas (oxygen-containing gas) through the porous membrane.

A suction port side of the air pump 26 communicates with the atmosphere through a pipeline 108.

A discharge port side of the air pump 26 communicates with one end side of the flow path 52 of the humidifier 28 through pipelines 110 and 112. The other end side of the flow path 52 of the humidifier 28 communicates with one end side of a pipeline 114, and the other end side of the pipeline 114 communicates with the cathode flow field 47 in the fuel cell stack 16 through the oxygen-containing gas inlet communication port 116.

The pipeline 114 is provided with a cathode inlet pressure sensor 67 that detects the pressure of the oxygen-containing gas flowing through the pipeline 114 as a cathode inlet pressure Pci [kPa].

A discharge side of the flow path 54 of the humidifier 28 communicates with one inlet side of a diluter 66 through pipelines 117 and 118.

The pipeline 110 on the discharge port side of the air pump 26 branches such that one of the branched pipelines communicates with the pipeline 112, and the other of the branched pipelines communicates with the pipeline 118 via a bypass pipeline 120 and a bypass valve 122.

The hydrogen tank 18 is a container that stores high-purity hydrogen compressed at high pressure. The fuel gas discharged from the hydrogen tank 18 is supplied to the inlet of the anode flow field 48 of the fuel cell stack 16 through the main stop valve 138, the pipeline 140, the injector 30 in the hydrogen-isolating cover 56, a pipeline 142, the ejector 32, and a pipeline 144, via the fuel gas inlet communication port 146.

The pipeline 144 is provided with an anode inlet pressure sensor 68 that detects the pressure of the fuel gas flowing through the pipeline 144 as an anode inlet pressure Pai [kPa].

The outlet of the anode flow field 48 communicates with an inlet 151 of the gas-liquid separator 34 through the fuel gas outlet communication port 148 and a pipeline 150, and fuel exhaust gas (anode off-gas), which is hydrogen-containing gas, is supplied from the anode flow field 48 to the gas-liquid separator 34.

The gas-liquid separator 34 separates the fuel exhaust gas into a gas component and a liquid component (liquid water). The gas component of the fuel exhaust gas is discharged from a gas discharge port 152 of the gas-liquid separator 34 and supplied to the ejector 32 through a pipeline 154. When a bleed valve 158 is opened as necessary, the fuel exhaust gas is also supplied to the pipeline 114 for oxygen-containing gas through a communication pipeline 156 (communication flow path) and the bleed valve 158.

The bleed valve 158 is opened to prevent deterioration of the anode 43 caused by a decrease in the hydrogen concentration in the anode flow field 48 due to nitrogen gas present in the cathode flow field 47 permeating through the membrane electrode assembly 44. That is, the bleed valve 158 is opened when it is determined that the hydrogen concentration in the anode flow field 48 has decreased during normal power generation such as during traveling.

When the bleed valve 158 is opened, the fuel exhaust gas supplied to the pipeline 114 for oxygen-containing gas is mixed in the pipeline 114 with the oxygen-containing gas supplied from the air pump 26, and is supplied to the cathode flow field 47 of the fuel cell stack 16 through the oxygen-containing gas inlet communication port 116.

A part of the fuel exhaust gas supplied to the cathode flow field 47 is hydrogen-ionized by the catalytic reaction of the cathode 42, and the hydrogen ions react with the oxygen-containing gas to produce water. The remaining unreacted fuel exhaust gas is discharged together with nitrogen from the oxygen-containing gas outlet communication port 102, flows through the pipeline 104, the flow path 54, and the pipeline 118, is diluted in the diluter 66 by the oxygen-containing gas supplied from the bypass pipeline 120, and is discharged to the outside (atmosphere) of the fuel cell vehicle 10 through a pipeline 124.

Fuel gas is supplied to the ejector 32 from the injector 30 provided on the upstream side of the ejector 32, through the pipeline 142. Therefore, the fuel exhaust gas (the gas component) supplied via the gas-liquid separator 34 is sucked by the ejector 32 and mixed with the fuel gas, and, in this state, supplied to the anode flow field 48 of the fuel cell stack 16 via the fuel gas inlet communication port 146 through the pipeline 144 of the fuel cell stack 16.

The liquid component of the fuel exhaust gas is discharged from a liquid discharge port 160 of the gas-liquid separator 34 to the outside of the fuel cell vehicle 10 through a pipeline 162, a drain valve 164, a pipeline 166, the diluter 66, and the pipeline 124.

Actually, a part of the fuel exhaust gas is discharged from the drain valve 164 to the pipeline 166 together with the liquid component. In order to discharge the fuel exhaust gas to the outside after diluting the hydrogen gas in the fuel exhaust gas, a part of the oxygen-containing gas discharged from the air pump 26 is supplied to the diluter 66 through the bypass pipeline 120 and the pipeline 118.

Therefore, after the hydrogen gas in the fuel exhaust gas is diluted in the diluter 66, the fuel exhaust gas is discharged to the outside.

The fuel cell stack 16 is further provided with a coolant supply flow path 74$a$ and a coolant discharge flow path 74$b$ respectively for supplying and discharging a coolant to and from a coolant flow field (not shown) provided in the fuel cell stack 16.

The control device 12 is constituted by an electronic control unit (ECU) including a microcomputer including a CPU (not shown), a storage unit (ROM and RAM), and the like.

The control device 12 includes: a fuel cell electronic control unit (FCECU) 70 that controls the entire fuel cell system 14; a management ECU (not shown) that manages the power of the fuel cell stack 16, the power of the high-voltage battery 82, and the power consumption of the air pump 26, the motor 84, and an air conditioner (not shown); and a motor ECU (not shown) that controls the motor 84 through the output regulator 80.

In addition to control programs for the fuel cell vehicle 10, the fuel cell system 14, and the hydrogen leakage detection/shut-off system 100 (described later), the determination table 78 (described later in detail) and the like are stored in the storage unit.

[Hydrogen Leakage Detection/Shut-Off System]

Figure 2:
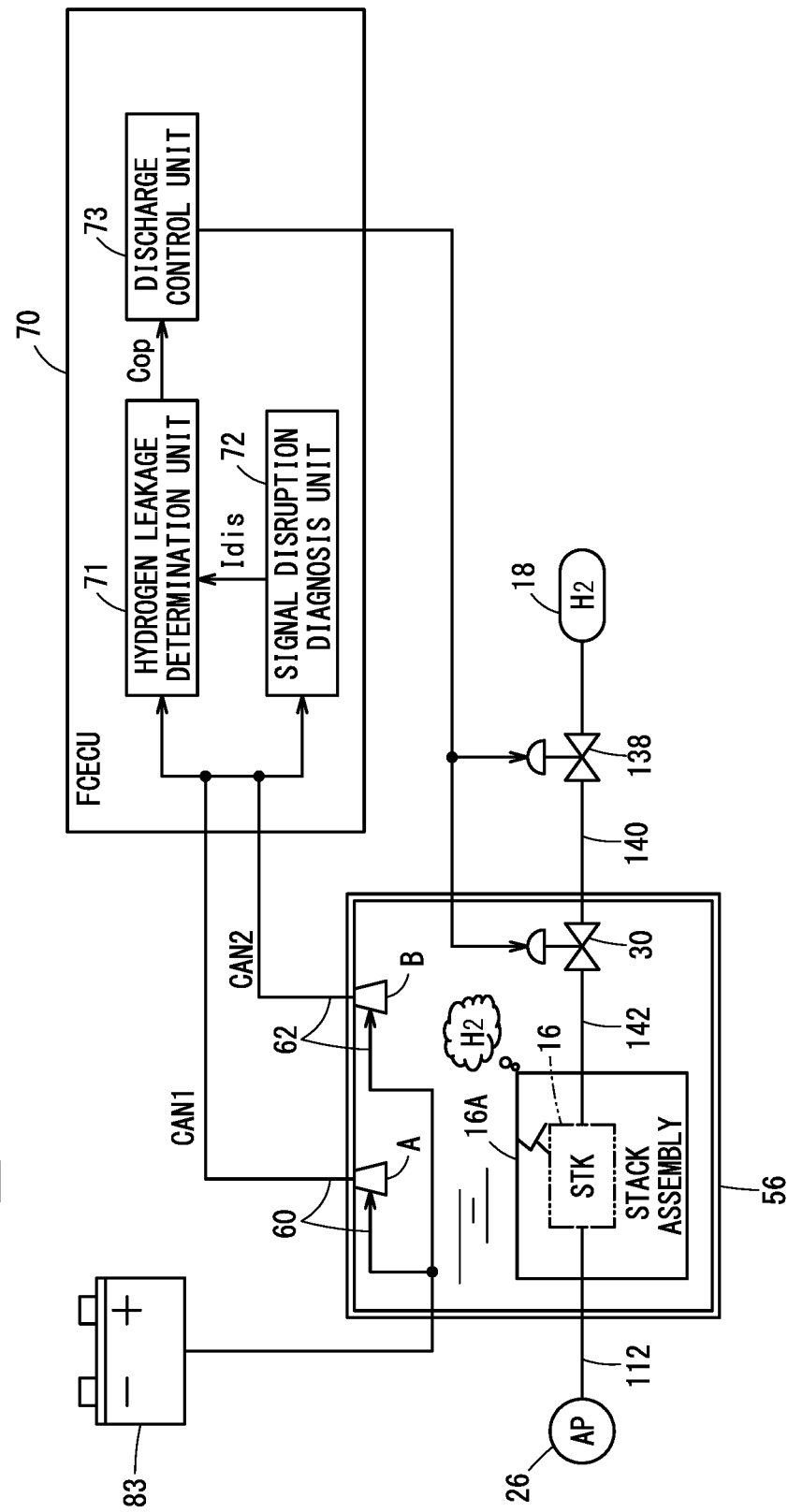
FIG. 2 is a schematic block diagram showing the configuration of a hydrogen leakage detection/shut-off system mounted on the fuel cell system according to the embodiment.

FIG. 2 is a schematic block diagram showing the configuration of the hydrogen leakage detection/shut-off system 100 mounted in the fuel cell system 14 of FIG. 1.

The stack assembly 16A constituted by the fuel cell stack 16, the ejector 32, the gas-liquid separator 34, the humidifier 28, the diluter 66, and the like is fixed inside the hydrogen-isolating cover 56 disposed in the motor room of the fuel cell vehicle 10.

For convenience of understanding of the hydrogen leakage detection/shut-off system 100, the stack assembly 16A may be simply referred to as the fuel cell stack 16.

Fuel gas is supplied from the hydrogen tank 18 to the pipeline 142 in the stack assembly 16A via the main stop valve 138, the pipeline 140, and the injector 30.

Further, oxygen-containing gas is supplied from the air pump 26 to the pipeline 112 in the stack assembly 16A.

In FIG. 1, the fuel cell stack 16 generates power by an electrochemical reaction between fuel gas and oxygen-containing gas, and supplies the generated power to an external load (including the high-voltage battery 82) through the output regulator 80.

In FIG. 2, a plurality of gas sensors A and B are attached to the roof portion of the hydrogen-isolating cover 56 above the stack assembly 16A to detect the concentration of fuel gas (hydrogen) that may leak from the stack assembly 16A and output detection signals CAN1 and CAN2 to the FCECU 70. One of the gas sensors A and B may be used.

The FCECU 70 includes a hydrogen leakage determination unit 71, a signal disruption diagnosis unit 72, and a discharge control unit 73 as computing units that function when the CPU executes programs. Further, the FCECU 70 includes a timer 79 which is a time measuring device for measuring a determination time Td to be described later.

The signal disruption diagnosis unit 72 determines whether the detection signals CAN1 and CAN2 are disrupted (referred to as CAN signal disruption for convenience of understanding) based on the states of the detection signals CAN1 and CAN2 transmitted from the gas sensors A and B, and transmits disruption information Idis including the determination result to the hydrogen leakage determination unit 71.

The hydrogen leakage determination unit 71 determines whether gas leakage (hydrogen leakage) has occurred based on the disruption information Idis and the detection signals CAN1 and CAN2, and transmits an operation command Cop corresponding to the determination result to the discharge control unit 73.

The discharge control unit 73 transmits a valve closing signal of the main stop valve 138 to the main stop valve 138 in accordance with the operation command Cop, transmits a discharge stop signal (a pulse width modulation (PWM) signal having a duty ratio of 0) of the injector 30 to the injector 30, and controls lighting of the warning lamp 85 for gas leakage (possibility of gas leakage).

[Normal Control Power Generation Operation]

In order to perform operation control of the fuel cell vehicle 10, the control device 12 calculates a motor requested current based on an accelerator position from an accelerator position sensor (not shown) that detects the position of an accelerator pedal (not shown), a vehicle speed from a vehicle speed sensor (not shown), an SOC (remaining capacity) from an SOC sensor (not shown) that detects the SOC of the high-voltage battery 82, and the like.

The control device 12 determines a supply ratio of the generated power and the power of the high-voltage battery 82 through the output regulator 80 based on the motor requested current, and controls driving of the fuel cell stack 16 and the motor 84 to control traveling of the fuel cell vehicle 10.

When controlling the driving of the motor 84, the control device 12 controls the power generation amount (generated current value) of the fuel cell system 14 by controlling the discharge flow rate of the air pump 26 and the INJ flow rate (duty ratio of the PWM signal) of the injector 30 based on the ratio of the generated power, that is, a requested current value including the motor requested current from the fuel cell vehicle 10 side.

Figure 3:
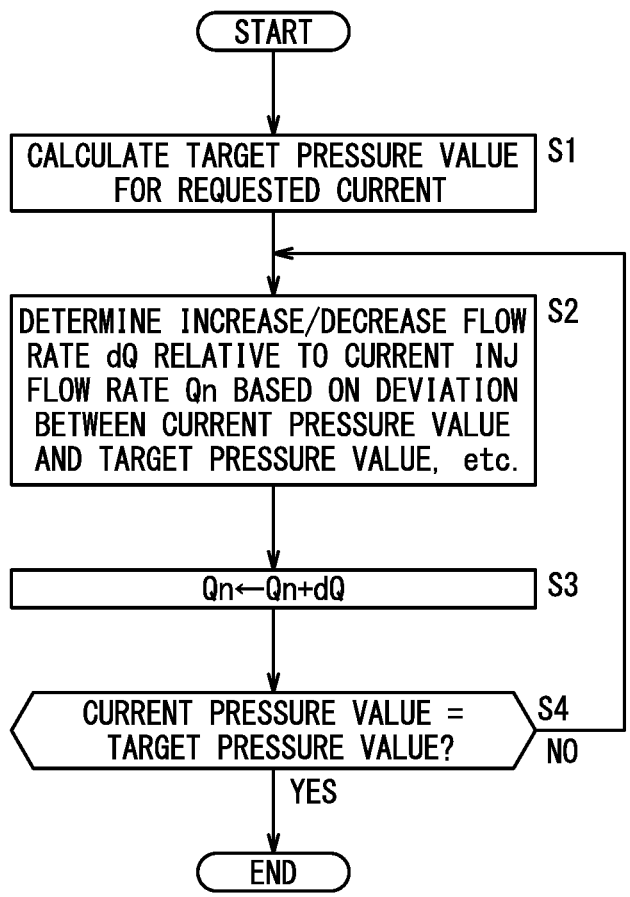
FIG. 3 is a flowchart for explaining the operation of the normal control power generation.

FIG. 3 is a flowchart for explaining the normal control power generation operation.

In step S1, for the requested current value from the fuel cell vehicle 10 side, a target pressure value Ptar in the fuel stack is calculated with reference to a map (characteristic) of a required pressure value in the fuel cell stack 16 with respect to the generated current value (in this embodiment, the anode inlet pressure Pai [kPa] detected by the anode inlet pressure sensor 68 and the cathode inlet pressure Pci [kPa] detected by the cathode inlet pressure sensor 67).

In step S2, an increase/decrease flow rate dQ relative to a current fuel gas discharge amount (referred to as INJ flow rate) Qn of the injector 30 is determined based on a deviation between the current pressure values (Pai, Pci) and the target pressure value Ptar, and an estimated value of amount of hydrogen consumed for power generation in the fuel cell stack 16.

In step S3, the duty ratio of the PWM signal that is supplied to a control terminal of the injector 30 is changed such that the INJ flow rate, which is the discharge flow rate of the injector 30, is changed from Qn to Qn+dQ.

In step S4, it is confirmed whether or not the current pressure values (Pai, Pci) have reached the target pressure value Ptar. If not (step S4: NO), the processes of steps S2 to S4 are feedback-controlled until the affirmative determination of step S4 is established (step S4: YES). When the affirmative determination is established (step S4: YES), the process is ended and the normal control power generation after step S1 is continued.

[Main Part Operation]

Next, the operation of the hydrogen leakage detection/shut-off system 100, which is a main part of the fuel cell system 14 basically configured and operated as described above, will be described with reference to the flowchart of FIG. 4.

In step S11, the fuel cell system 14 normally performs the normal control power generation described with reference to the flowchart of FIG. 3.

During the normal control power generation, in step S12, the hydrogen leakage determination unit 71 and the signal disruption diagnosis unit 72 continuously monitor the contents of the detection signals CAN1 and CAN2 of the two gas sensors A and B supplied thereto, and perform gas leakage determination (hydrogen (i.e., fuel gas) leakage determination) based on the states of the detection signals CAN1 and CAN2 and with reference to the determination table 78.

FIG. 5 is an explanatory diagram of the determination table 78 showing the hydrogen leakage determination (presence of hydrogen leakage, absence of hydrogen leakage) that is based on the detection states of the detection signals CAN1 and CAN2 of the two gas sensors A and B, and showing the contents of the operation commands Cop corresponding to the detected states (also referred to as detection states) I to IV.

In a case where both of the detection signals CAN1 and CAN2 of the two gas sensors A and B indicate that the hydrogen concentration is lower than a threshold (threshold for invalidating the detection concentration with slight noise) (state I), it is determined that there is no hydrogen leakage, and the operation command Cop is not issued. In this case, the process is ended, and the process returns to step S11.

When the hydrogen concentration indicated by at least one of the detection signals CAN1 and CAN2 of the two gas sensors A and B is equal to or higher than the threshold (state II) or when both the detection signals CAN1 and CAN2 are disrupted (state III), the process proceeds to step S14 as an operation command Cop issuance standby state to be described next.

That is, in the case of the state II or the state III, together with the operation command Cop for turning on the warning lamp 85 on the assumption that there is hydrogen leakage, the operation command Cop for closing the main stop valve 138 for shutting off the supply of fuel gas to the fuel cell stack 16 and the operation command Cop for stopping the discharge operation by the injector 30 are set in the issuance standby state.

The CAN signal disruption is diagnosed by the signal disruption diagnosis unit 72. The signal disruption diagnosis unit 72 determines that signal disruption has occurred when the bus level (bus voltage) of the CAN does not exhibit a recessive or dominant normal voltage due to disconnection of a CAN signal line, disconnection of a CAN connector, or the like, and transmits signal disruption information Idis to the hydrogen leakage determination unit 71.

The hydrogen leakage determination unit 71 determines that there is no hydrogen leakage when one of the gas sensors is in a failure state or in a CAN signal disruption state and the hydrogen concentration from the other gas sensor is less than the threshold (state IV) according to the detection states of the detection signals CAN1 and CAN2 of the two gas sensors A and B. In this case, the hydrogen leakage determination unit 71 issues the operation command Cop for turning on the warning lamp 85. The FCECU 70 turns on the warning lamp 85 in step S13 to end the process, and the process returns to step S11.

When the operation command Cop for closing the main stop valve 138 for shutting off the supply of the fuel gas to the fuel cell stack 16 and the operation command Cop for stopping the discharge operation by the injector 30 enter the issuance standby state, the timer 79 starts counting down the determination time Td of about several seconds for determining the occurrence of a CAN disruption (hydrogen leakage) in step S14. The timer 79 is a software timer by the FCECU 70, but may be a hardware timer.

In this step S14, the states of the detection signals CAN1 and CAN2 of the two gas sensors A and B are continuously acquired and monitored for determining the occurrence of the CAN disruption (hydrogen leakage) during the determination time Td. That is, the detection of the states is continued for the determination time Td.

The determination time Td is set to a time determined in advance so that the total leakage amount until the main stop valve 138 is closed and the injector 30 stops discharging is equal to or less than a predetermined amount even if the fuel cell stack 16 is damaged and fuel gas leaks.

Next, in step S15, the normal control power generation operation is switched to an INJ flow rate restriction control power generation operation described below.

The reason why the normal control power generation operation is switched to the INJ flow rate restriction control power generation operation will be described.

During the determination time Td, the main stop valve 138 is opened, and immediately after the states are detected, the injector 30 remains set to the discharge amount (INJ flow rate) for the normal control power generation operation. If the fuel cell stack 16 breaks due to a collision or the like of the fuel cell vehicle 10 and the fuel gas existing therein leaks, the anode inlet pressure Pai decreases.

Then, since the anode inlet pressure Pai is controlled so as to return to the target pressure value (step S4: NO→step S2, S3 in FIG. 3), the INJ flow rate automatically increases, and there is a possibility that the fuel gas leakage is facilitated. This facilitating of fuel gas leakage is avoided in advance by the "INJ flow rate restriction control power generation operation", and the total leakage amount is made smaller than the predetermined amount.

[INJ Flow Rate Restriction Control Power Generation Operation]

FIG. 6 is a flowchart for explaining the INJ flow rate restriction control power generation operation. In step S31, a map (characteristic) of the INJ flow rate with respect to the generated current value for the fuel cell stack 16, which is in a normal state without leakage, is called.

In step S32, an INJ flow rate (PWM signal duty ratio) corresponding to a requested current value from the fuel cell vehicle 10 side is calculated.

In step S33, the INJ flow rate calculated in step S32 is compared with the current INJ flow rate to determine an increase/decrease flow rate dQ.

In step S34, the duty ratio of the PWM signal that is supplied to the control terminal of the injector 30 is changed such that the INJ flow rate, which is the discharge flow rate of the injector 30, is changed from Qn to Qn+dQ.

In this INJ flow rate restriction control power generation operation, feedback control for setting the current pressure value to the target pressure value, which is performed in the normal control power generation operation, is not performed, but feedforward control is performed. Therefore, facilitating of fuel gas leakage can be avoided in advance, and the total leakage amount can be suppressed to be smaller than the predetermined amount.

Although not shown, in the case of the fuel cell system 14 in which the injectors 30 are provided in parallel, the "INJ flow rate restriction control" may be replaced with control for stopping discharge by one of the injectors 30 (control for canceling parallel discharge by the injectors 30).

Further, in addition to the "INJ flow rate restriction control" or the control for canceling the parallel discharge by the injectors 30, by increasing the current usage amount of an auxiliary device such as an air conditioner (not shown), it is possible to further suppress the leakage amount of the fuel gas into the hydrogen-isolating cover 56 or the motor room to a smaller amount.

Figure 4:
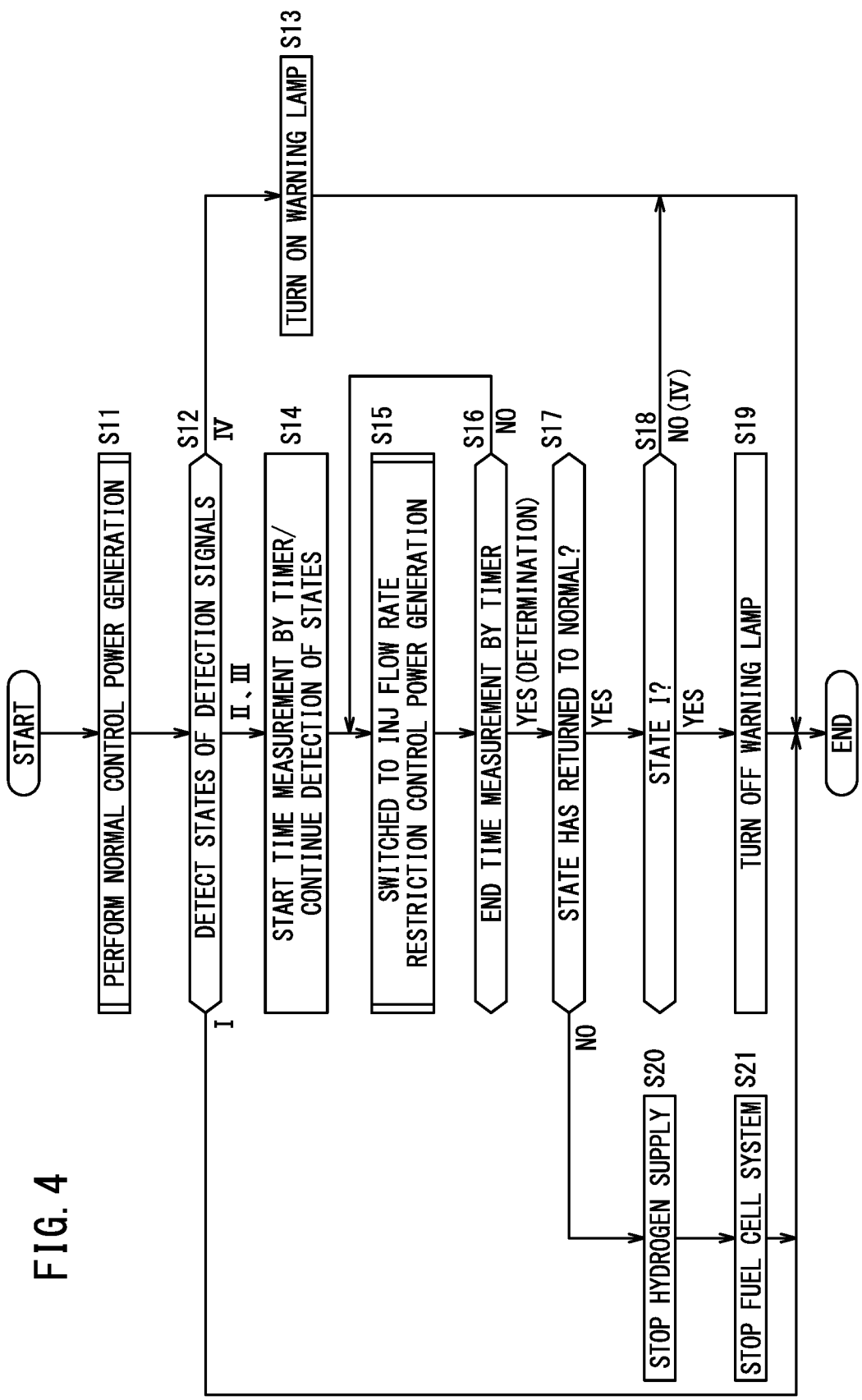
FIG. 4 is a flow chart for explaining the operation of the hydrogen leakage detection/shut-off system.

In step S16 of FIG. 4, it is determined whether or not the time measurement of the determination time Td by the timer 79 has ended, the INJ flow rate restriction control power generation in step S15 is performed until the time measurement ends, and when the time measurement of the determination time Td has ended, the process proceeds to the determination of step S17.

In step S17, it is determined whether or not the state has returned to normal. In this case, as described with reference to the determination table 78 of FIG. 5, it is determined whether or not the states of the two gas sensors A and B at the end of the time measurement of the determination time Td have transitioned from the detection states II and III (with hydrogen leakage determination) to the detection states I and IV (without hydrogen leakage determination).

In a case where the states have transitioned to the states I and IV, it is determined that the states have returned to the normal states (that it was false detection and there was no gas leakage) (step S17: YES).

In this case, when the detection state returns to the detection state I (where the detection values of both the gas sensors A and B are less than the threshold) in step S18, the warning lamp 85 is turned off in step S19, and the process returns to step S11.

On the other hand, if the detection state has returned to the detection state IV in step S18, the process returns to the normal control power generation in step S11.

The reason why the detection states II and III return to the detection states I and VI is, for example, that noise is mixed into the detection signals CAN1 and CAN2 or that the power supply from the low-voltage battery 83 is shut off due to, for example, an instantaneous contact failure of the connector.

On the other hand, when it is determined in step S17 that transition from the detection states II and III has not occurred, it is determined that gas leakage has occurred (step S17: NO). In this case, in step S20, the main stop valve 138 is closed and the operation of the injector 30 is stopped (the duty ratio of the PWM signals is set to 0) by the operation commands Cop. Thus, the supply of hydrogen to the fuel cell stack 16 is stopped.

Next, in step S21, the operation of the auxiliary devices such as the air pump 26 is stopped, and the operation of the fuel cell system 14 is stopped.

As described above, according to the present embodiment, in the case of an instantaneous false detection such that the state is restored in less than the determination time Td, power generation is continued without stopping the fuel cell system 14, and thus it is possible to prevent deterioration of the fuel cell stack 16 over time. On the other hand, when occurrence of the gas leakage is determined during the determination time Td, the supply of the fuel gas can be shut off without increasing the leakage amount.

[Explanation Using Timing Chart]

An example of the operation of the hydrogen leakage detection/shut-off system 100 described with reference to the flowchart of FIG. 4 will be described with reference to a timing chart of FIG. 7.

At a time point t0, an actual disruption of the detection signals CAN1 and CAN2 occurs due to a collision or the like.

At a time point t1 after a time lag Td1, the disruption of the detection signals CAN1 and CAN2 (detection state II or detection state III) is detected in the FCECU 70.

At the time point t1, the timer 79 is activated to start counting down the determination time Td.

In a case where the detection state II or the detection state III continues even a time (preceding action determination time Td2) between the time point t1 and a time point t2 elapses, the preceding action is determined at the time point t2. In order to start the INJ flow rate restriction control power generation in step S15, the duty ratio of the PWM signal to be supplied to the injector 30 is reduced by the operation command Cop from the FCECU 70. As a result, the power supplied to the injector 30 is reduced. The INJ flow rate is restricted at a time point t3 after a time lag Td3.

At a time point t4 at which the measurement of the determination time Td ends, when it is determined that the CAN disruption or the hydrogen leakage (state II or III) has occurred, the supply of power to the injector 30 is shut off by the operation command Cop.

As a result, the INJ flow rate is set to 0 at a time point t5 after a time lag Td4.

In this case, the hydrogen leakage flow rate instantaneously increases at the time point t0 at which the fuel cell stack 16 is damaged. However, when the duty ratio of the PWM signal is set to a maximum value (DutyMax), the INJ flow rate converges to a flow rate corresponding to the maximum value of the duty ratio after the time point t1.

When the INJ flow rate from the injector 30 is restricted at the time point t3, the INJ flow rate is maintained at the restricted flow rate from the time point t3 to the time point t5. Note that, between the time point t2 and the time point t5, the current load is increased by increasing the power consumption of the auxiliary device, for example, an air conditioner, and the consumption of fuel gas is increased. This makes it possible to reduce the amount of fuel gas leaking into the motor room.

[Modification]

The "INJ flow rate restriction control power generation" described with reference to FIG. 6 in the above embodiment can be integrally incorporated into the normal control power generation described with reference to FIG. 3.

Figure 8:
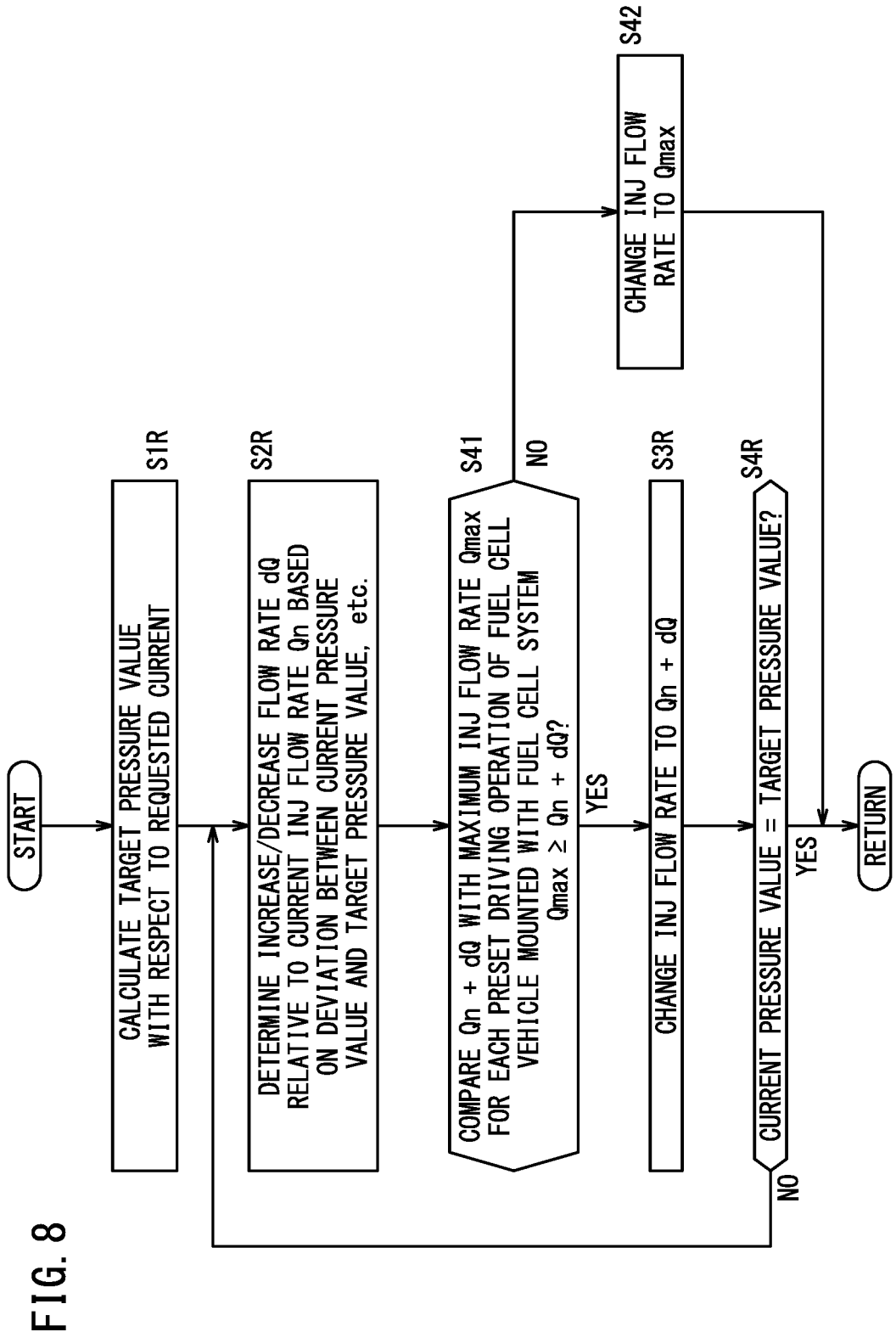
FIG. 8 is a flowchart for explaining the operation of the power generation control in which the INJ flow rate restriction control is incorporated into the normal power generation control.

FIG. 8 shows a flowchart of "normal control power generation with INJ flow rate restriction control" in which the "INJ flow rate restriction control power generation" is incorporated into the normal control power generation.

In the flowchart of FIG. 8, the same or corresponding processes as those in the flowcharts of FIGS. 3 and 6 are denoted by the same step numbers with "R", and detailed description thereof is omitted.

In step S1R, a target pressure value with respect to a requested current value is calculated.

In step S2R, an increase/decrease flow rate dQ relative to a current INJ flow rate Qn is determined based on the deviation between the current pressure value and the target pressure value, or the like.

In step S41, as shown in the following expression (1), it is determined whether or not the determined Qn+dQ is equal to or less than a maximum INJ flow rate Qmax for each preset driving operation of the fuel cell vehicle 10.

$$Q\max \geq (Qn+dQ) \tag{1}$$

Note that the preset driving operation refers to each driving operation of the fuel cell vehicle 10 such as idling (stopping), acceleration, deceleration, and cruising (for each vehicle speed range).

Among the driving operations, in a state such as acceleration in which the load fluctuation is large due to the accelerator work of the user, if the INJ flow rate is restricted to the maximum INJ flow rate Qmax, the travel response of the fuel cell vehicle 10 deteriorates. For this reason, it is preferable to incorporate the "normal control power generation with INJ flow rate restriction control" into power generation control for the driving operation such as idling or warm-up immediately after the start of traveling.

When the determination of step S41 is negative (step S41: NO), in step S42, the INJ flow rate Qn is changed to the maximum INJ flow rate Qmax, and the process returns to step S1R.

On the other hand, when the determination in step S41 is affirmative (step S41: YES), in step S3R, the duty ratio of the PWM signal that is supplied to the control terminal of the injector 30 is changed such that the INJ flow rate, which is the discharge flow rate of the injector 30, is changed from Qn to Qn+dQ.

Further, in step S4R, it is determined whether or not the current pressure values (Pai, Pci) have reached the target pressure value Ptar. If not (step S4R: NO), the processes of steps S2R, S41, S3R and S4R are repeated so that the current pressure values (Pai, Pci) become the target pressure value Ptar. That is, the INJ flow rate is feedback-controlled until the affirmative determination of step S4R is established (step S4R: YES). When the affirmative determination is established (step S4R: YES), the process is ended, and the process returns to step S1R.

According to this modification, it is possible to prevent increase of the total leakage amount under an operating condition corresponding to the maximum INJ flow rate Qmax.

Invention that can be Grasped from Embodiment and Modification

Here, the invention that can be grasped from the above-described embodiment and modification will be described below. For convenience of understanding, some of the components are denoted by the reference numerals used in the above-described embodiment, but the components are not limited to those denoted by the reference numerals.

The fuel cell system 14 according to the present invention comprises: a fuel cell configured to generate power by an electrochemical reaction between a fuel gas and an oxygen-containing gas; a fuel gas supply device configured to supply the fuel gas to the fuel cell; and an oxygen-containing gas supply device configured to supply the oxygen-containing gas to the fuel cell, the fuel cell system further comprising: a gas sensor A, B configured to detect leakage of the fuel gas from the fuel cell; and a control device configured to control a state of supply of the fuel gas by the fuel gas supply device, based on a detection signal from the gas sensor, wherein the control device: limits a supply amount of the fuel gas from the fuel gas supply device when leakage of the fuel gas is detected by the detection signal or when disruption of the detection signal is detected; and shuts off the supply of the fuel gas by the fuel gas supply device when determining, after limiting the supply amount of the fuel gas, that the leakage of the fuel gas or the disruption of the detection signal has occurred.

According to the present invention, when the leakage of the fuel gas is detected by the detection signal of the gas sensor or the disruption of the detection signal is detected, the control device limits the supply amount of the fuel gas without immediately shutting off the supply of the fuel gas, in order to determine whether or not the detection is false detection.

In this way, it is possible to avoid stopping of power generation of the fuel cell caused by shut-off of fuel gas due to false detection, and to prevent deterioration of the fuel cell over time.

On the other hand, when it is determined that the detection is not false detection, the fuel gas is shut off so that leakage of the fuel gas can be prevented.

The fuel cell system according to the present invention may further comprise a timer 79, and the control device may: limit the supply amount of the fuel gas from the fuel gas supply device and set a determination time in the timer, when the leakage of the fuel gas is detected by the detection signal or when the disruption of the detection signal is detected; and determine that the leakage of the fuel gas or the disruption of the detection signal has occurred, in a case where the leakage of the fuel gas continues to be detected by the detection signal or the disruption of the detection signal continues to be detected after the determination time set in the timer has elapsed.

Thus, since the fuel gas is shut off when it is determined that the detection is not false detection, leakage of the fuel gas can be prevented.

Further, in the fuel cell system according to the present invention, the control device may cancel limitation on the supply amount of the fuel gas in a case where the leakage of the fuel gas is not detected any more by the detection signal before the determination time set in the timer elapses.

With this configuration, it is possible to prevent deterioration of the fuel cell over time caused by shut-off of the fuel gas due to false detection.

Further, in the fuel cell system according to the present invention, the control device may cancel limitation on the supply amount of the fuel gas in a case where the disruption of the detection signal is resolved before the determination time set in the timer elapses.

With this configuration, it is possible to prevent deterioration of the fuel cell over time caused by shut-off of the fuel gas due to false detection.

Further, the fuel cell system according to the present invention may further comprise a pressure sensor configured to detect a pressure of the fuel gas supplied from the fuel gas supply device to the fuel cell, and the control device may: control the pressure detected by the pressure sensor to be a target pressure; and limit the supply amount of the fuel gas supplied from the fuel gas supply device to the fuel cell by reducing the target pressure.

With this configuration, when the supply amount of the fuel gas is limited, the target pressure is reduced so that the pressure detected by the pressure sensor is reduced. Therefore, the amount of the fuel gas supplied from the fuel gas supply device to the fuel cell can be reliably limited.

Further, a plurality of the gas sensors may be provided, and the control device may: immediately shut off the supply of the fuel gas without limiting the supply amount of the fuel gas, when the leakage of the fuel gas is detected by at least one of the plurality of gas sensors or when the disruption of all detection signals from the plurality of gas sensors is detected.

By providing a plurality of the gas sensors, robustness and redundancy of gas leakage detection can be enhanced, and the supply of the fuel gas can be immediately shut off with high accuracy.

It is to be understood that the present invention is not limited to the above-described embodiment, and various configurations can be adopted therein based on the description of this specification.

What is claimed is:
1. A fuel cell system, comprising:
a fuel cell configured to generate power by an electrochemical reaction between a fuel gas and an oxygen-containing gas;
a fuel gas supply device configured to supply the fuel gas to the fuel cell;
an oxygen-containing gas supply device configured to supply the oxygen-containing gas to the fuel cell;
a gas sensor configured to detect leakage of the fuel gas from the fuel cell;
a timer; and
a control device configured to control a state of supply of the fuel gas by the fuel gas supply device, based on a detection signal from the gas sensor, the control device comprising one or more processors that execute computer-executable instructions stored in a memory, wherein
the one or more processors execute the computer-executable instructions to cause the control device to:
limit a supply amount of the fuel gas from the fuel gas supply device and set a determination time in the timer, while supply of the fuel gas to the fuel cell continues, when leakage of the fuel gas is detected by the detection signal or when disruption of the detection signal is detected;
determine that the leakage of the fuel gas or the disruption of the detection signal has occurred, in a case where the leakage of the fuel gas continues to be detected by the detection signal or the disruption of the detection signal continues to be detected after the determination time set in the timer has elapsed; and
shut off the supply of the fuel gas by the fuel gas supply device when determining, after limiting the supply amount of the fuel gas, that the leakage of the fuel gas or the disruption of the detection signal has occurred.
2. The fuel cell system according to claim 1, wherein the one or more processors cause the control device to:

cancel limitation on the supply amount of the fuel gas in a case where the leakage of the fuel gas is not detected any more by the detection signal before the determination time set in the timer elapses.

3. The fuel cell system according to claim 1, wherein the one or more processors cause the control device to:
cancel limitation on the supply amount of the fuel gas in a case where the disruption of the detection signal is resolved before the determination time set in the timer elapses.

4. The fuel cell system according to claim 1, further comprising a pressure sensor configured to detect a pressure of the fuel gas supplied from the fuel gas supply device to the fuel cell, wherein
the one or more processors cause the control device to:
control the pressure detected by the pressure sensor to be a target pressure; and
limit the supply amount of the fuel gas supplied from the fuel gas supply device to the fuel cell by reducing the target pressure.

5. The fuel cell system according to claim 1, wherein
a plurality of the gas sensors are provided, and
the one or more processors cause the control device to:
immediately shut off the supply of the fuel gas without limiting the supply amount of the fuel gas, when the leakage of the fuel gas is detected by at least one of the plurality of gas sensors or when the disruption of all detection signals from the plurality of gas sensors is detected.

* * * * *